（12）United States Patent
Clausen

(10) Patent No.: US 7,023,930 B2
(45) Date of Patent: Apr. 4, 2006

(54) REDUCING THE CREST FACTOR OF A MULTICARRIER SIGNAL

(75) Inventor: Axel Clausen, Munich (DE)

(73) Assignee: Infineon Technologies AG, Munich (DE)

(*) Notice: Subject to any disclaimer, the term of this patent is extended or adjusted under 35 U.S.C. 154(b) by 63 days.

(21) Appl. No.: 10/721,116

(22) Filed: Nov. 25, 2003

(65) Prior Publication Data
US 2004/0156442 A1 Aug. 12, 2004

(30) Foreign Application Priority Data
Nov. 28, 2002 (DE) ................. 102 55 687

(51) Int. Cl.
H04K 1/10 (2006.01)
(52) U.S. Cl. ..................................... 375/260
(58) Field of Classification Search ................ 375/260, 375/259, 285, 296, 295, 219, 222, 316, 346; 708/300, 445; 370/343, 482, 203, 210, 206, 370/486
See application file for complete search history.

(56) References Cited

U.S. PATENT DOCUMENTS 6,529,925 B1    3/2003  Schenk
6,757,299 B1*   6/2004  Verma .................. 370/482
2002/0191705 A1* 12/2002 Melsa et al. ............ 375/295

FOREIGN PATENT DOCUMENTS

DE          19850642          5/2000

OTHER PUBLICATIONS

Documents AA and AB are equivalent.
Henkel et al., "PAR reduction revisited: an extension to Tellado's method," 6th International OFDM-Workshop (InOWo), 2001 Hamburg, 6 pages.
Tellado et al., "Further Results on Peak-to-Average Ration Reduction," Project T1E1.4: VDSL/ADSL, San Antonio, TX, Aug. 31, 1998, 8 pages.

* cited by examiner

Primary Examiner—Robert Pascal
Assistant Examiner—Krista M. Flanagan
(74) Attorney, Agent, or Firm—Fish & Richardson P.C.

(57) ABSTRACT

A method for reducing the crest factor of a multi-carrier signal includes evaluating an inverse Fourier transform of the multi-carrier signal, thereby generating a transformed multi-carrier signal; defining a signal-to-be-corrected to be the transformed multi-carrier signal; generating a simulated output signal; estimating a signal maximum of the simulated output signal; deriving a first correction variable on the basis of the estimate; correcting the signal-to-be-corrected using at least the first correction variable, thereby generating a corrected output signal having a reduced crest factor; defining the corrected output signal to be the signal-to-be-corrected; and iteratively repeating the last five steps until the corrected output signal has a crest factor below a predetermined threshold, or a predetermined number of iterations has occurred.

14 Claims, 3 Drawing Sheets

REDUCING THE CREST FACTOR OF A MULTICARRIER SIGNAL

FIELD OF THE INVENTION

The present invention relates to digital signal processing, and in particular, to methods for reducing the crest factor of a multi-carrier signal.

RELATED APPLICATIONS

This application claims priority from German Application Serial No. 10255687.3, filed on Nov. 28, 2002, the entire contents of which are herein incorporated by reference.

BACKGROUND

Multicarrier signals generally have a high ratio between the signal maximum and the standard deviation of the signal. This ratio is also referred to as the crest factor and places stringent requirements on amplifiers and transmitters in order not to risk saturation effects which could result in loss of data. It is therefore actually necessary to reduce this crest factor for DMT (discrete multitone) and for OFDM (orthogonal frequency division multiplex) signals, in order to prevent saturation of the amplifier and transmitter and, furthermore, to reduce the power consumption of the amplifier and of the transmitter during transmission. If the crest factor is squared, then this results in the so-called PAR (peak-to-average ratio), which should likewise be reduced, for the reason mentioned above.

German Laid-Open Specification DE 198 50 642 A1 describes a method for reducing the crest factor of a signal. In this case, a signal is transformed using an IFT device and both a signal maximum and a signal minimum of the output signal are determined, from which a correction variable is derived. The output signal from the IFT device is corrected by means of the correction variable, which is derived from the determined value of the signal maximum and of the signal minimum, and with a second correction value possibly being calculated for correction of the crest factor of a signal. However, this has the disadvantage that any influence on the crest factor from downstream devices (amplifiers, converters, transducers, transformers, filters, etc.) are ignored in the correction process.

FIG. 4 shows a simplified block diagram of a number of schematic elements of a DMT or OFDM transmission device. A datastream 10 is subjected to inverse Fourier transformation in an IFT device 11. The multicarrier signal 12 is then, for example, passed to a high-pass filter 13, where it is filtered. The filtered output signal 14 is then supplied to an interpolation stage 15 and/or to an interpolation device with a low-pass filter. The filtered and interpolated output signal 16 is then converted in a block 17 to an analog signal, and is then filtered using a low-pass filter, before the output signal 18 from this converter device 17 with a low-pass filter is passed to an amplifier device (not shown).

DMT and OFDM signals are subject to the disadvantage that the ratio of the maximum to the standard deviation (crest factor) of the signal is very high. In order to reduce the requirements for a downstream output amplifier, particularly with regard to the linearity and the power consumption of the amplifier device, and for digital filters, as regards resolution, and for D/A converters, various methods are known from the literature which allow the crest factor to be reduced. The subject matter of most of the methods is to reduce the crest factor directly after the IFT device 11, for example starting at nodes 12'. However, this method is subject to the problem that the crest factor will rise again as a result of the downstream filters 13 and the interpolation with low-pass filtering in the block 15. However, in order to make it possible to reduce the power consumption of the downstream amplifier, it is necessary to reduce the output crest factor of the signal 18.

A more successful reduction to the crest factor can be achieved if the reduction is carried out after the interpolation in the block 15, that is to say starting for example at the node 16'. In the paper "PAR reduction revisited: an extension to Tellado's method", which was published in conjunction with the sixth International OFDM Workshop (InOWo) 2001 in Hamburg, Werner Henkel and Valentin Zrno propose an advantageous method such as this which is explained, for example, in the published paper "Further Results on Peak-to-Average Ratio Reduction" by Jose Tellado and John M. Cioffi. According to the article by Henkel, the maximum value of the signal 16 is in this case determined after interpolation in the filter device 15, for each data frame of the input signal 10. This information, that is to say the precise sample value of the maximum value of the signal (both on the time axis or in the x direction as well as the amplitude of the maximum value, that is to say relating to the y direction), is used in order to correct the output signal 12 from the transformation device 11, for example starting at the point 12'.

The corrected signal is then once again passed through the high-pass filter 13 and the interpolation device 15 and, if necessary, the described steps are repeated. This implementation according to Henkel and based on Tellado is subject to the disadvantage that all of the filters from the high-pass filter 13 and the interpolation device 15 must be taken into account for each iteration or repetition. This leads to time-consuming computation operations and thus to restricted practical usefulness of the Henkel method according to the prior art.

SUMMARY

The object of the present invention is therefore to provide a method for reducing the crest factor of a multicarrier signal, which requires less computation complexity.

The idea on which the present invention is based essentially comprises determining only the position and the approximate magnitude or height of the maximum value of the signal after the interpolation device 15. In this way, only estimated values of the signal maximum are calculated with little complexity, instead of having to calculate these values exactly for each iteration. This estimation process is preferably carried out using shortened filter simulations, which model the original filter impulse responses.

The present invention solves the initially mentioned problem in particular by providing a method for reducing the crest factor of a multicarrier signal having the following steps: (a) transformation of a signal using an IFT device; (b) interpolation and filtering of the output signal using an interpolation device which has a filter device; (c) determination of an estimated value of a signal maximum of the interpolated and filtered output signal, from which a correction variable is derived; (d) correction of the output signal from the IFT device using the correction variable (32) which is derived from the determined estimated value of the signal maximum; and (e) iterative repetition of the two last-mentioned steps until a predetermined number of iterations is reached, and/or a predetermined crest factor is achieved.

According to one preferred development, the output signal from the IFT device is filtered using a filter device, between method steps (a) and (c).

According to a further preferred development, during the process of determining the correction variable from the estimated value of the signal maximum of the interpolated and filtered output signal, the output signal from the IFT device or, possibly, the corrected output signal, once one iteration has been carried out, is temporarily stored in a memory device of a PAR reduction device.

According to a further preferred development, during the process of determining the correction variable from the estimated value of the signal maximum of the interpolated and filtered output signal, the output signal from the IFT device or, possibly, the corrected output signal once one iteration has been carried out under the influence of the filter device and of the interpolation device, which has a filter device, on the output signal from the IFT device or on the corrected signal is estimated in a simulation device, in order to produce a simulation signal in the PAR reduction device.

According to a further preferred development, the correction variable is determined from the estimated value of the signal maximum from the simulation signal in a detection device of the PAR reduction device, and this correction variable is multiplied by a normalized signal, which is similar to a Dirac, with the sampling positions synchronized, and with the multiplication result being added to the signal which is temporarily stored in the memory device.

According to a further preferred development, two or more correction variables are determined from the estimated value of the signal maximum in one iteration step, and are added to the signal which is temporarily stored in the memory device.

According to a further preferred development, during the process of determining the estimated value in the PAR reduction device, the bit width and hence the resolution of the output signal from the IFT device are reduced.

According to a further preferred development, only half of the sample values of the simulated signal are stored in the detection device in order to determine the correction variable from the estimated value of the signal maximum.

According to a further preferred development, during the process of determining the correction variable from the estimated value of the signal maximum, the sampling point and the estimated amplitude of the signal maximum are calculated.

According to a further preferred development, the simulation signal is calculated from a convolution of a shortened impulse response of the first filter device and of a reduced impulse response of the interpolation device, which has a second filter device, using the output signal from the IFT device or the corrected signal, once one iteration has been carried out.

According to a further preferred development, the first 20% of the sample values of the impulse response of the first filter device and the central 60% of the sample values of the impulse response of the interpolation device with the second filter device are used for the convolution.

According to a further preferred development, the output signal from the second filter device is converted in a D/A converter and is filtered in a further filter device before being supplied to an amplifier device.

According to a further preferred development, a high-pass filter is used as the first filter device, a low-pass filter is used as the second filter device and a low-pass filter is likewise used as the further filter device.

According to a further preferred development, a fourth order IIR high-pass filter is used as the first filter device, and an FIR interpolation filter is used as the second filter device.

According to a further preferred development, the signal is a DMT or OFDM signal.

One exemplary embodiment of the invention will be explained in more detail in the following description and is illustrated in the drawings, in which:

BRIEF DESCRIPTION OF THE FIGURES

Identical reference symbols in the figures denote identical or functionally identical components.

DETAILED DESCRIPTION

Figure 1:
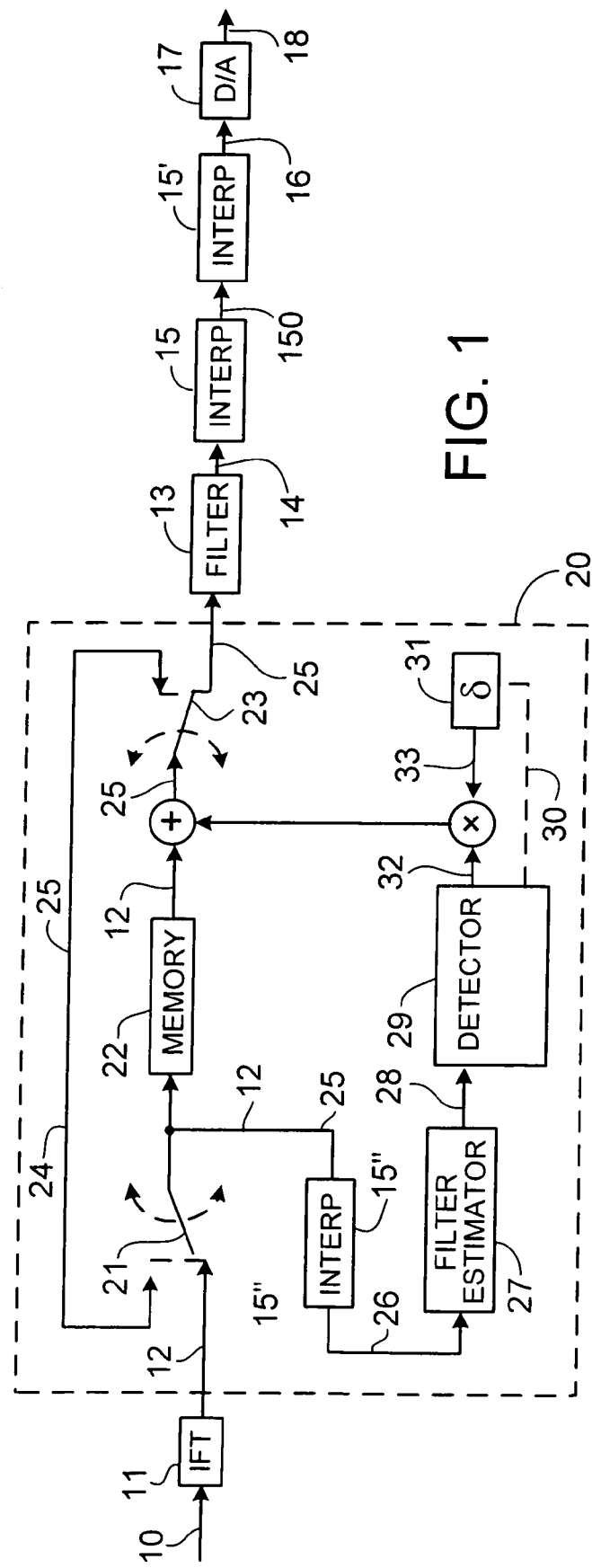
FIG. 1 shows a schematic block diagram to explain one embodiment of the present invention.

In the block diagram shown in FIG. 1, a datastream 10 is supplied to an IFT device 11 in which an inverse Fourier transformation is carried out, for example an inverse fast Fourier transformation of the signal 10. The transformed output signal 12, a multicarrier signal such as a DMT or OFDM signal, then has its crest factor, that is to say the ratio of the signal maximum value to the signal standard deviation, reduced in a PAR reduction device 20. The PAR reduction device 20 is followed by a filter device 13, which emits a filtered output signal 14. This filtered output signal 14 is then interpolated in a first interpolation device 15, for example an interpolation stage with a downstream low-pass filter, that is to say a predetermined number of zeros are inserted between successive sample values, with mirror-image sidebands that are produced in the process in the filtered signal 14 being suppressed in the integrated low-pass filter device. An interpolated and filtered signal 150 is thus generated at the output of the first interpolation device.

This is preferably followed by a second interpolation device 15', in which the interpolated and filtered output signal 150 from the first interpolation device 15 is once again oversampled, with a second predetermined number of zeros being inserted between adjacent sample values of the already interpolated signal from the interpolation device 15. Low-pass filtering to eliminate undesirable sidebands is also carried out in the second interpolation device 15'. More zeros are preferably inserted between adjacent sample values in the second interpolation device 15' than in the first interpolation device 15. The interpolated output signal 16 from the second interpolation device 15 is then converted to an analog signal, and is filtered, in a converter device 17 with a low-pass filter, thus producing a filtered analog output signal 18, which is amplified in a downstream amplifier device (not shown) and can be transmitted via a transmission device (not shown).

In order now to reduce the crest factor of the analog output signal 18, the transformed output signal 12 from the IFT device 11 is, according to the embodiment of the present invention illustrated in FIG. 1, supplied via a first control device 21 to a memory device 22, where it is temporarily stored. The control device 21 is used together with a second control device 23 to carry out iterations via a connecting device 24 in the PAR reduction device 20 when a corrected output signal 25 is not yet below a predetermined crest factor. Furthermore, the control devices 21 and 23 can also be operated so as to pass on the corrected output signal 25 from the PAR reduction device 20 once a predetermined time period has elapsed.

The transformed output signal 12 from the IFT device 11 or, if one iteration has been carried out, the signal 25 whose crest factor has been corrected, is supplied to an interpolation device 15". The same predetermined number of zeros are inserted between adjacent sample values in this interpolation device 15" as in the interpolation device 15, although no low-pass filtering is carried out. A signal 26 which is produced in this way from the signals 12 and 25 is then supplied to a filter simulation or filter estimation device 27. This filter estimation device is used to estimate both the influence of the first filter device 13 and that of the second filter device in the interpolation device 15.

Figure 2A:
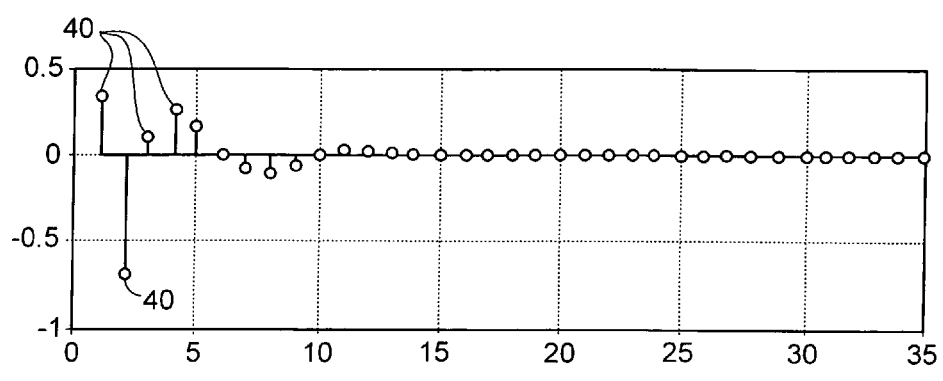
FIGS. 2a, b show two schematic functional diagrams to explain the method of operation of one embodiment of the present invention, with FIG. 2a showing the impulse response of a fourth-order IIR high-pass filter, and FIG. 2b showing the impulse response of an FIR interpolation filter.
Figure 2B:
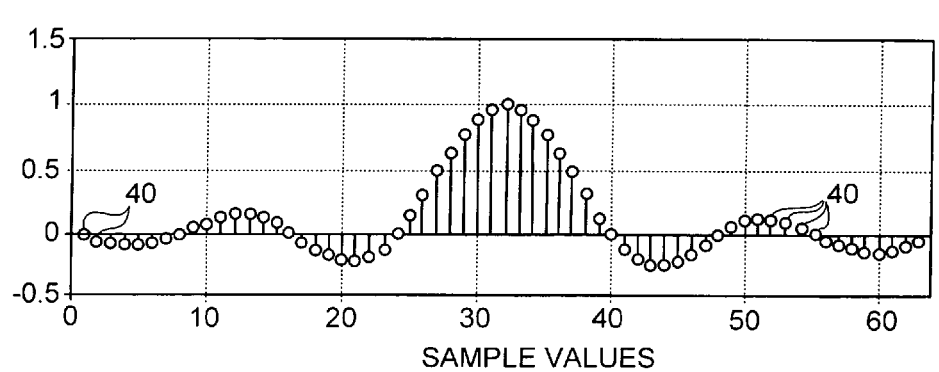

However, this is not done by including a detailed simulation of the impulse response of the first and second filter devices 13, 15 that are involved, but by merely using approximations of the corresponding impulse responses in the filter estimation device 27, in order to reduce the computation complexity. In order to make it possible to estimate the influence of the first and second filter devices in the high-pass filter 13 and in the low-pass filter in the interpolation device 15 on the transformed signal 12 and on the corrected signal 25, a convolution process, for example, is carried out using a shortened impulse response of the corresponding first and second filter devices with the interpolated signal 26, that is to say with the signal 26 provided with additional zeros between adjacent sample values. FIGS. 2a and 2b, which illustrate examples of two impulse responses, will now be used as a reference to explain the filter approximation process.

FIG. 2a shows an example of a sampled impulse response of the first filter device 13, for example of a fourth-order IIP high-pass filter, in which it can be seen that subsequent maximum values are determined only by the first of the coefficients 40 of the filter. Furthermore, the bit width of the coefficients 40 and of the input signal as well can be reduced in order to reduce the computation complexity in the filter estimation device 27 as shown in FIG. 1. In the example shown in FIG. 2a, it is sufficient to use the first four coefficients with reduced resolution for estimation of the output maximum value.

A similar situation also applies to the second filter device in the interpolation device 15 shown in FIG. 1. FIG. 2b shows an example of the impulse response of this second filter device, for example an FIR interpolation filter. In this case, the coefficients 40 in the center of the filter are essentially required, that is to say approximately the first 15 coefficients 40, and the last 15 coefficients 40 are redundant. If shortened impulse responses such as these are used for approximation, then only a lower level of computation complexity is now required and it is correspondingly possible to calculate more iterations for each data frame.

Referring now once again to FIG. 1, an output signal 28 or simulation signal from the filter estimation device 27, which contains the approximated influence of the filters 13, 15 on the transformed signal 12 or on the corrected signal 25, is supplied to a detection device 29. In order to determine the maximum value of the signal 28, the only signal values which are considered in the detection device 29 are those which are above a predetermined amplitude, that is to say above a predetermined threshold value. The corresponding sample values are determined successively from these signal values which are above the threshold value, for example starting with the highest signal value. The position, that is to say the specific sample value with the greatest amplitude, is in each case detected in the detection device 29. This sampling position or these sampling positions, that is to say in each case the precise position of the respective sample value in the data frame of the signal 28, is/are passed via the connection 30 to a Dirac function memory device 31. A function which is similar to a Dirac function is stored, normalized with respect to the maximum amplitude 1, in this Dirac function memory device 31.

One or more correction variables 32 which have been determined in the detection device 29 and have been derived from the signal maxima (possibly modified such that the estimated signal maximum is reduced by a threshold value and is multiplied by a factor of between 0 and 1) are then multiplied by the function 33 which is similar to a Dirac function and is normalized with respect to the maximum amplitude 1, and are then subtracted from the signal which is stored in the memory device 22, that is to say either from the transformed signal 12 or, once one iteration loop has been carried out, from the already corrected signal 25. In this way, the crest factor (that is to say the ratio of the signal maximum to the signal standard deviation) is reduced in the PAR device 20, and a corrected signal 25 is produced, with a reduced crest factor.

The corrected signal 25 can now once again be passed through a reduction process (iteration) via the control device 23, the connecting device 24 and the control device 21, as has already been described in the text above with reference to the transformed signal 12. In order to reduce the computation complexity in the PAR device 20, according to the invention, a signal maximum with only an estimated amplitude, approximated by the blocks 15" and 27 after passing through the filters 13 and 15 on the basis of the filter approximation in each iteration process, is subtracted from the original signal 12 or from the already corrected signal 25.

Figure 3:
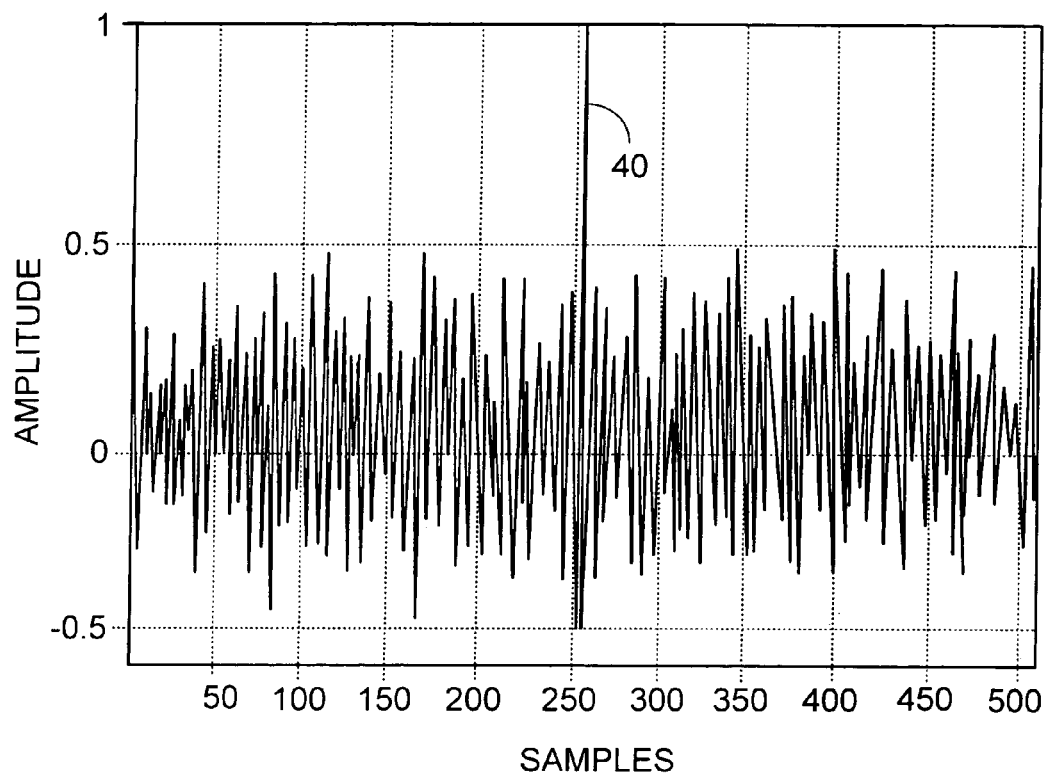
FIG. 3 shows a schematic signal diagram to explain the method of operation of one embodiment of the present invention.
Figure 4:
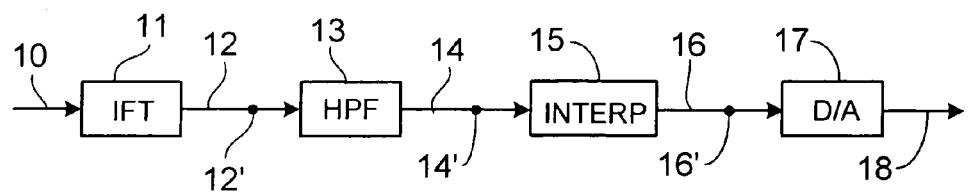
FIG. 4 shows a block diagram to explain a known procedure.

FIG. 3 shows an example of a sampled signal with an impulse 41 similar to a Dirac function, normalized with respect to the amplitude 1. In order to reduce the hardware complexity, it is also possible, for example, to make use of the symmetry of the signal as shown in FIG. 3 in order, for example, to store only half of the sample values.

Although the present invention has been described above with reference to a DMT or OFDM transmission device, it is not restricted to this and can, in principle, be applied to any multicarrier signals in order to reduce the crest factor or the peak-to-average ratio.

An interpolation device 15 and, in consequence, also the interpolation simulation 15" are preferably used to carry out as little oversampling as possible, for example two or four times, in order to optimize the computation time. The influence of the second interpolation device 15' with a corresponding low-pass filter as well as the D/A converter unit 17 with a low-pass filter have not been included in the PAR reduction process since their influence is only minor although, in principle, this is likewise possible with approximated filter impulse responses in the PAR reduction device 20.

The invention claimed is:

1. A method for reducing the crest factor of a multi-carrier signal, the method comprising:
   (a) evaluating an inverse Fourier transform of the multi-carrier signal, thereby generating a transformed multi-carrier signal;
   (b) defining a signal-to-be-corrected to be the transformed multi-carrier signal;
   (c) generating a simulated output signal, wherein generating a simulated output signal comprises filtering the signal-to-be-corrected;
   (d) estimating a signal maximum of the simulated output signal;
   (e) deriving a first correction variable on the basis of the estimate;
   (f) correcting the signal-to-be-corrected using at least the first correction variable, thereby generating a corrected output signal having a reduced crest factor;
   (g) defining the corrected output signal to be the signal-to-be-corrected; and
   (h) iteratively repeating steps (c) through (g) until the occurrence of a condition selected from the group consisting of causing the corrected output signal to have a crest factor below a predetermined threshold, and performing a predetermined number of iterations; the method further comprising reducing a bit width of the transformed multi-carrier signal.

2. A method for reducing the crest factor of a multi-carrier signal, the method comprising:
   (a) evaluating an inverse Fourier transform of the multi-carrier signal, thereby generating a transformed multi-carrier signal;
   (b) defining a signal-to-be-corrected to be the transformed multi-carrier signal;
   (c) generating a simulated output signal;
   (d) estimating a signal maximum of the simulated output signal;
   (e) deriving a first correction variable on the basis of the estimate;
   (f) correcting the signal-to-be-corrected using at least the first correction variable, thereby generating a corrected output signal having a reduced crest factor;
   (g) defining the corrected output signal to be the signal-to-be-corrected; and
   (h) iteratively repeating steps (c) through (g) until the occurrence of a condition selected from the group consisting of causing the corrected output signal to have a crest factor below a predetermined threshold, and performing a predetermined number of iterations; the method further comprising reducing a bit width of the transformed multi-carrier signal.

3. A method for reducing the crest factor of a multi-carrier signal, the method comprising:
   (a) evaluating an inverse Fourier transform of the multi-carrier signal, thereby generating a transformed multi-carrier signal;
   (b) defining a signal-to-be-corrected to be the transformed multi-carrier signal;
   (c) generating a simulated output signal;
   (d) estimating a signal maximum of the simulated output signal;
   (e) deriving a first correction variable by identifying a particular sample point at which the estimate occurs;
   (f) correcting the signal-to-be-corrected using at least the first correction variable, thereby generating a corrected output signal having a reduced crest factor;
   (g) defining the corrected output signal to be the signal-to-be-corrected; and
   (h) iteratively repeating steps (c) through (g) until the occurrence of a condition selected from the group consisting of causing the corrected output signal to have a crest factor below a predetermined threshold, and performing a predetermined number of iterations.

4. A method for reducing the crest factor of a multi-carrier signal, the method comprising:
   (a) evaluating an inverse Fourier transform of the multi-carrier signal, thereby generating a transformed multi-carrier signal;
   (b) defining a signal-to-be-corrected to be the transformed multi-carrier signal;
   (c) generating a simulated output signal by simulating either a high-pass filter followed by a low-pass filter, or a fourth order IIR high pass filter and an FIR interpolation filter;
   (d) estimating a signal maximum of the simulated output signal;
   (e) deriving a first correction variable on the basis of the estimate;
   (f) correcting the signal-to-be-corrected using at least the first correction variable, thereby generating a corrected output signal having a reduced crest factor;
   (g) defining the corrected output signal to be the signal-to-be-corrected; and
   (h) iteratively repeating steps (c) through (g) until the occurrence of a condition selected from the group consisting of causing the corrected output signal to have a crest factor below a predetermined threshold, and performing a predetermined number of iterations.

5. A method for reducing the crest factor of a multi-carrier signal, the method comprising:
   (a) evaluating an inverse Fourier transform of the multi-carrier signal, thereby generating a transformed multi-carrier signal;
   (b) defining a signal-to-be-corrected to be the transformed multi-carrier signal;
   (c) generating a simulated output signal by stimulating an effect of a downstream filtering-and-interpolating system on the corrected output signal;
   (d) estimating a signal maximum of the simulated output signal;
   (e) deriving a first correction variable on the basis of the estimate;
   (f) correcting the signal-to-be-corrected using at least the first correction variable, thereby generating a corrected output signal having a reduced crest factor;
   (g) defining the corrected output signal to be the signal-to-be-corrected; and
   (h) iteratively repeating steps (c) through (g) until the occurrence of a condition selected from the group consisting of causing the corrected output signal to have a crest factor below a predetermined threshold, and performing a predetermined number of iterations.

6. The method of claim 5, further comprising temporarily storing the corrected output signal for use in a subsequent iteration step.

7. The method of claim 5,
   wherein correcting the signal-to-be-corrected comprises subtracting therefrom a correction signal formed by multiplying the first correction variable by a normalized impulse, thereby generating the corrected output signal.

8. The method of claim 7, further comprising temporarily storing the corrected output signal.

9. The method of claim 5, further comprising:
deriving a second correction variable from the estimate in the same iteration step in which the first correction variable is derived,
subtracting, from the signal-to-be-corrected, a value derived from the first and second correction variables, thereby generating the corrected output signal.

10. The method of claim 9, further comprising temporarily storing the corrected output signal.

11. The method of claim 5, wherein the simulated signal comprises a plurality of sample values and deriving the correction variable comprises using a subset of the sample values.

12. The method of claim 5, wherein simulating an effect of a filtering-and-interpolating system comprises convolving a shortened impulse response of a filter and a reduced impulse response of an interpolator with the signal-to-be-corrected.

13. The method of claim 12, further comprising:
selecting the shortened impulse response to be the first 20% of the sample values of the impulse response of the filter; and
selecting the reduced impulse response to be the central 60% of the sample values of the impulse response of the interpolator.

14. The method of claim 5, further comprising passing the corrected output signal through a D/A converter.

* * * * *